(12) United States Patent
Kobayashi et al.

(10) Patent No.: US 12,018,992 B2
(45) Date of Patent: Jun. 25, 2024

(54) PRESSURE SENSOR WITH TAPERED STEM

(71) Applicant: TDK CORPORATION, Tokyo (JP)

(72) Inventors: Masanori Kobayashi, Tokyo (JP); Ken Unno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 358 days.

(21) Appl. No.: 17/437,736

(22) PCT Filed: Mar. 6, 2020

(86) PCT No.: PCT/JP2020/009673
§ 371 (c)(1),
(2) Date: Sep. 9, 2021

(87) PCT Pub. No.: WO2020/184434
PCT Pub. Date: Sep. 17, 2020

(65) Prior Publication Data
US 2022/0155166 A1    May 19, 2022

(30) Foreign Application Priority Data
Mar. 11, 2019   (JP) .................................. 2019-043798

(51) Int. Cl.
*G01L 9/00*   (2006.01)
*G01L 19/14*  (2006.01)

(52) U.S. Cl.
CPC .......... *G01L 9/0052* (2013.01); *G01L 19/145* (2013.01)

(58) Field of Classification Search
CPC ... G01L 9/0052; G01L 19/145; G01L 9/0055; G01L 19/06; G01L 9/0042
See application file for complete search history.

(56) References Cited

U.S. PATENT DOCUMENTS

| 2005/0284228 A1* | 12/2005 | Toyoda ................. G01L 9/0055 73/726 |
| 2008/0202249 A1* | 8/2008 | Yokura ................. G01L 9/0055 73/726 |
| 2014/0209220 A1 | 7/2014 | Otomo et al. |

FOREIGN PATENT DOCUMENTS

| JP | H05-013782 A | 1/1993 |
| JP | H05-129636 A | 5/1993 |

(Continued)

OTHER PUBLICATIONS

Nov. 14, 2022 Search Report issued in European Patent Application No. 20769048.8.

(Continued)

*Primary Examiner* — Eric S. McCall
*Assistant Examiner* — Timothy P Graves
(74) *Attorney, Agent, or Firm* — Oliff PLC (57) ABSTRACT

A pressure sensor configured to prevent tearing or cracking of an insulating film for insulating between a stem and a detection circuit from occurring. A stem having a planar outer bottom surface, an outer side surface intersecting the outer bottom surface, and a pressure receiving inner surface that is the opposite surface to the outer bottom surface and receives pressure from a fluid to be measured; and a detection circuit provided to the outer bottom surface with an insulating film interposed therebetween. The stem has a foot part that: is formed to surround the outer bottom surface; consists of a surface which, when observed parallel to the outer bottom surface, faces a direction different from the direction of the outer bottom surface and the outer side surface; and connects between the outer bottom surface and the outer side surface. The insulating film covers a portion of the foot part.

10 Claims, 7 Drawing Sheets

(56) References Cited

FOREIGN PATENT DOCUMENTS

| JP | 2006-010623 A |   | 1/2006 |
|----|---------------|---|--------|
| JP | 2011-164072 A |   | 8/2011 |
| JP | 2011164072 A  | * | 8/2011 |

OTHER PUBLICATIONS

Aug. 25, 2021 International Preliminary Report on Patentability issued in International Patent Application No. PCT/JP2020/009673.

* cited by examiner

PRESSURE SENSOR WITH TAPERED STEM

TECHNICAL FIELD

The present invention relates to a pressure sensor in which a detection circuit is disposed on an outer bottom surface of a stem with an insulating film interposed therebetween.

BACKGROUND

As a pressure sensor, there is a known one in which a detection circuit is disposed on an outer bottom surface of a stem made of, for example, metal with an insulating film interposed therebetween. As the detection circuit, for example, there is one utilizing the piezoresistive effect to detect strain of a bottom wall portion (also referred to as a membrane or a diaphragm) of the stem by resistance change. In such a pressure sensor, the insulating film secures insulating properties between the stem and the detection circuit, and an appropriate pressure detection is thereby achieved by the detection circuit.

Since the insulating film of such a pressure sensor is formed on the bottom wall portion of the stem, where deformation occurs by pressure, and is exposed to a high temperature environment depending on the fluid to be measured, however, there are problems such as film peeling and cracking. Film peeling and cracking generated in the insulating film are problems because they may cause decrease in the performance and the durable life of the pressure sensor.

PRIOR ARTS

Patent Document

Patent Document 1: JPH0513782 (A)

SUMMARY OF INVENTION

Problems to be Solved by Invention

The present invention has been achieved under such circumstances and provides a pressure sensor that prevents problems of peeling and cracking in an insulating film insulating between a stem and a detection circuit.

Means for Solving the Problem

To solve the above object, a pressure sensor according to the present invention comprises:
  a stem including a planar outer bottom surface, an outer side surface extending in a direction intersecting the outer bottom surface, and a pressure receiving inner surface being an opposite surface to the outer bottom surface and configured to receive pressure from a fluid to be measured; and
  a detection circuit provided to the outer bottom surface with an insulating film interposed therebetween,
  wherein the stem includes a skirt portion formed so as to surround the outer bottom surface, constituted of a surface facing a direction different from that of the outer bottom surface and the outer side surface viewing from a direction parallel to the outer bottom surface, and connecting between the outer bottom surface and the outer side surface, and
  the insulating film covers at least a part of the skirt portion.

In the pressure sensor according to the present invention, the skirt portion is formed on the surface of the stem to which the insulating film is attached. In conventional stems, since the outer bottom surface and the outer side surface are connected substantially perpendicularly, it is conceivable that stress concentration occurs in the insulating film covering this part and its surroundings and causes film peeling and cracking. On the other hand, in the stem of the pressure sensor according to the present invention, the outer bottom surface and the outer side surface are not directly connected, but are connected via the skirt portion. Thus, the existence of the skirt portion reduces a sudden change in the surface direction between the outer bottom surface and the outer side surface, and the pressure sensor according to the present invention can prevent generation of peeling and cracking in the insulating film by reducing the stress concentration on the insulating film covering the surface of the stem.

For example, a length from a first boundary between the outer bottom surface and the skirt portion to a second boundary between the skirt portion and the outer side surface viewing from a direction perpendicular to the outer bottom surface may be 10 µm or more and 1 mm or less.

When the skirt portion has a length of 10 µm or more, the stress concentration on the insulating film covering the skirt portion and its surroundings can be reduced more effectively. Thus, the pressure sensor including such a skirt portion further improves the durability and reliability. When the skirt portion has a length of 1 mm or less, the pressure sensor is downsized.

For example, the skirt portion may include an inclined surface formed so as to surround the outer bottom surface and forming an angle of 30 degrees to 60 degrees with respect to the outer bottom surface viewing in a cross section orthogonal to the outer bottom surface.

When the skirt portion including such an inclined surface is disposed, it is possible to reduce the stress concentration on the insulating film covering the boundary between the outer bottom surface and the skirt portion and the boundary between the skirt portion and the outer side surface even in both of these boundaries. Thus, such a pressure sensor can effectively prevent generation of peeling and cracking in the insulating film.

For example, the inclined surface may be directly connected to the outer bottom surface or may be connected to the outer bottom surface via a connection surface forming an angle smaller than that of the inclined surface.

The skirt portion including such an inclined surface effectively reduces the stress concentration, particularly on the insulating film covering the boundary between the outer bottom surface and the skirt portion and can effectively prevent generation of peeling and cracking in the insulating film on and near the outer bottom surface.

For example, the inclined surface may form a predetermined angle with respect to the outer bottom surface viewing in a cross section orthogonal to the outer bottom surface.

Such an inclined surface can easily and accurately be formed by, for example, machining and can reduce dimensional variation. Thus, the pressure sensor including such a stem has good productivity.

For example, the inclined surface may change so that an angle formed with respect to the outer bottom surface increases as a distance from the outer bottom surface increases viewing in a cross section orthogonal to the outer bottom surface.

When the angle of the inclined surface changes, it is possible to more effectively reduce the change in the surface direction in the boundary between the skirt portion including the inclined surface and the outer bottom and side surfaces. Thus, such a pressure sensor can effectively prevent generation of peeling and cracking of the insulating film.

For example, the skirt portion may have a curved surface shape whose angle formed with respect to the outer bottom surface increases transitionally as a distance from a first boundary between the outer bottom surface and the skirt portion increases viewing in a cross section orthogonal to the outer bottom surface.

When the angle of the skirt portion changes, it is possible to more effectively reduce the change in the surface direction in the boundary between the skirt portion and the outer bottom and side surfaces. In addition, when the angle formed by the skirt portion and the outer bottom surface increases transitionally from the boundary, such a pressure sensor effectively prevents a local stress concentration on the insulating film and can effectively prevent generation of film peeling, cracking, and the like.

DETAILED DESCRIPTION OF INVENTION

Hereinafter, the present invention is described based on the embodiments shown in the figures.

Figure 1:
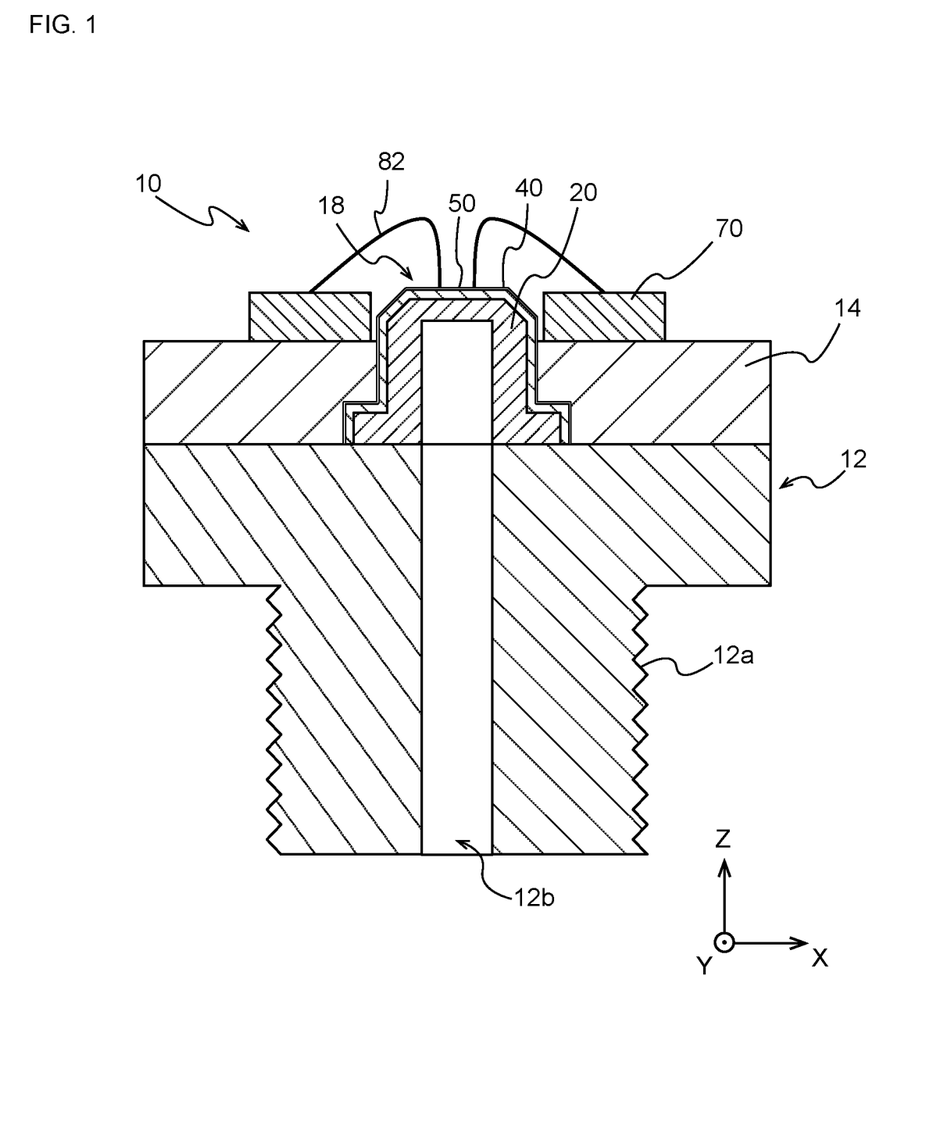
FIG. 1 is a schematic cross-sectional view of a pressure sensor according to First Embodiment of the present invention.

FIG. 1 is a schematic cross-sectional view of a pressure sensor 10 according to First Embodiment of the present invention. The pressure sensor 10 includes: a sensor main body 18 having, for example, a stem 20; a connection member 12 provided with a passage 12b for transmitting pressure to the stem 20; a holding member 14 for fixing the sensor main body 18 to the connection member 12; a substrate portion 70 wired to, for example, a detection circuit 50 provided on the stem 20; and the like.

As shown in FIG. 1, a screw groove 12a for fixing the pressure sensor 10 to a measurement target is formed on the outer periphery of the connection member 12. Since the pressure sensor 10 is fixed by the screw groove 12a, the passage 12b formed inside the connection member 12 airtightly communicates with a pressure chamber filled with fluid as the measurement target.

As shown in FIG. 1, the sensor main body 18 and the stem 20 included in the sensor main body 18 have a bottomed (upper bottom) tubular outer shape and are arranged at one end of the passage 12b of the connection member 12. The stem 20 is provided with a flange portion 21 on the opening side (on the negative side in the Z-axis). The sensor main body 18 is fixed to the connection member 12 by sandwiching the flange portion 21 between the holding member 14 and the connection member 12. The opening of the stem 20 and the passage 12b of the connection member 12 are airtightly connected using the holding member 14, and the pressure to be measured is transmitted to a bottom wall portion 22 of the stem 20 (see FIG. 2).

Figure 2:
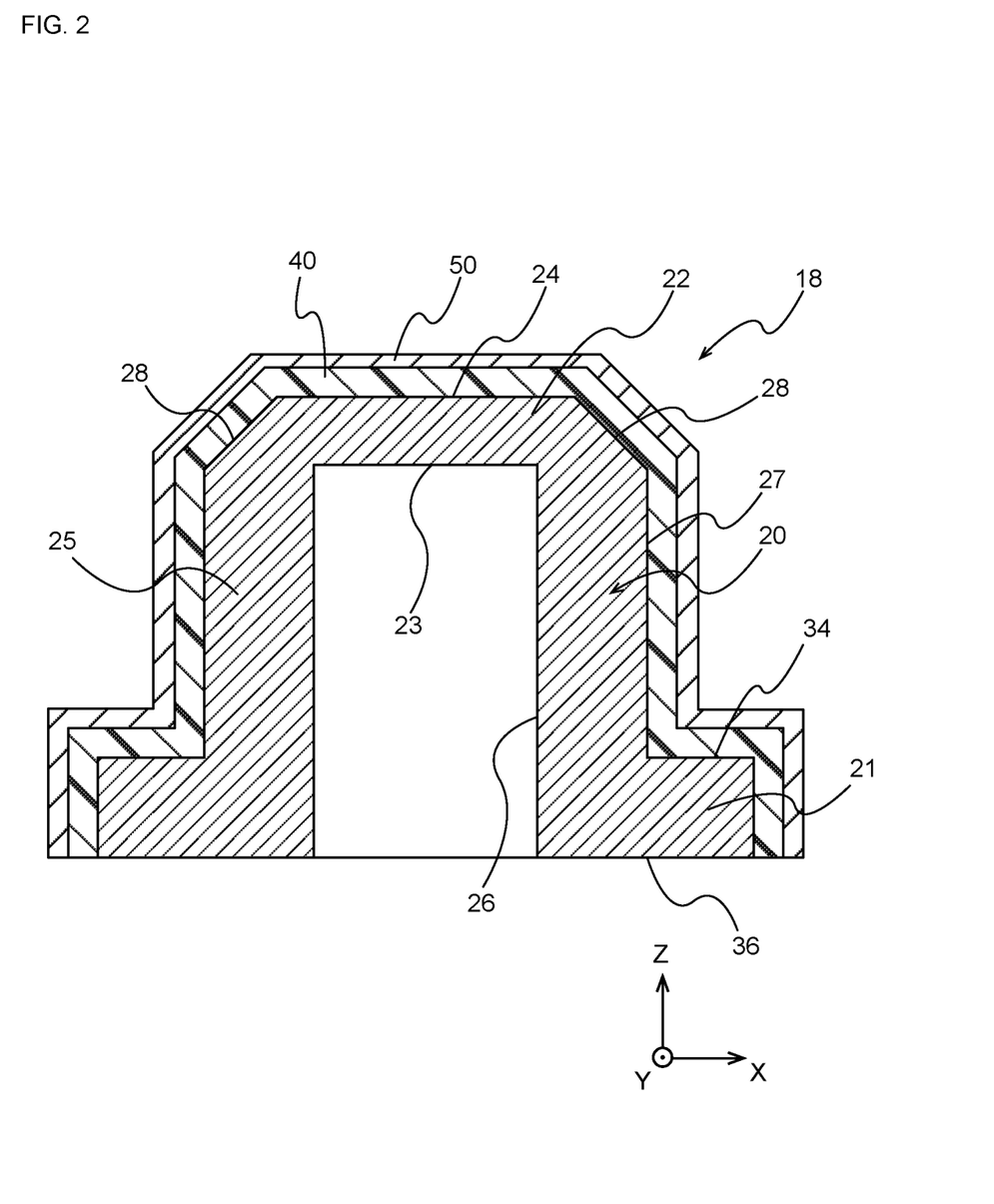
FIG. 2 is an enlarged cross-sectional view of a sensor main body of the pressure sensor shown in FIG. 1.

FIG. 2 is an enlarged cross-sectional view of the sensor main body 18 shown in FIG. 1. The sensor main body 18 includes the stem 20, an insulating film 40, and a detection circuit 50. The stem 20 includes a substantially circular plate-shaped bottom wall portion 22 extending in the XY plane direction (see FIG. 3A) and a substantially cylindrical side wall portion 25 connected to the outer periphery of the bottom wall portion 22 and extending to the negative side in the Z-axis.

Moreover, the stem 20 includes the flange portion 21 protruding in the outer diameter direction at the end of the side wall portion 25 on the negative side in the Z-axis, but the shape of the stem 20 is not limited to one shown in the embodiment and may be, for example, a bottomed cylindrical shape having no flange portion. The material of the stem 20 is not limited and is, for example, metal materials such as stainless steel, ceramics such as silicon carbide, or semiconductor material such as silicon.

As shown in FIG. 2, the insulating film 40 is formed so as to cover the entire outer surface of the stem 20. The insulating film 40 ensures the insulating property between the stem 20 and the detection circuit 50. A functional film for forming the detection circuit 50 is formed on the outer surface of the stem 20 via the insulating film 40. In FIG. 2, for easy description, the insulating film 40 and the functional film for forming the detection circuit 50 are illustrated thicker than the actual thickness.

Figure 3A:
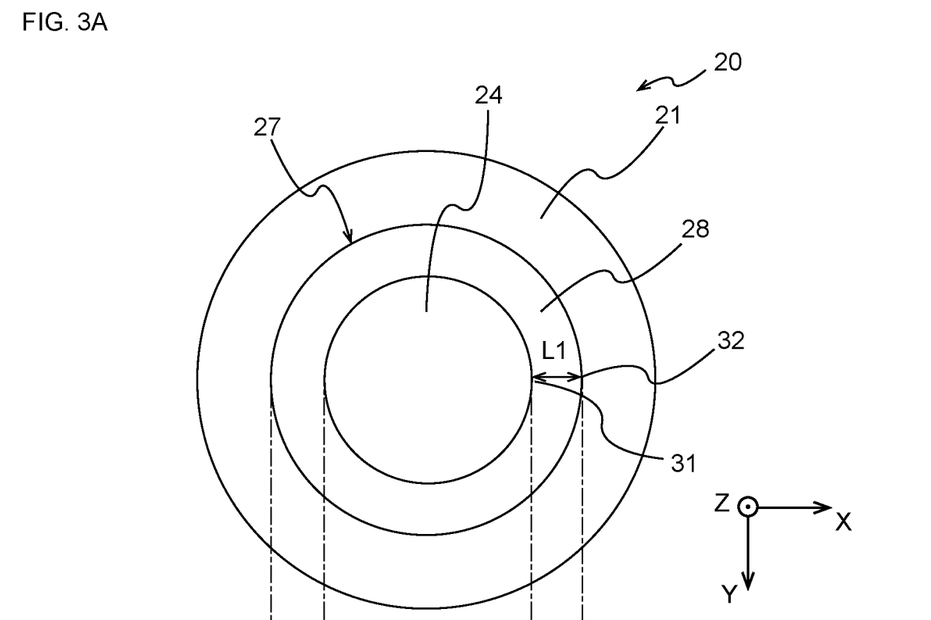
FIG. 3 is a conceptual diagram illustrating a shape of a stem included in the sensor main body shown in FIG. 2.
Figure 3B:
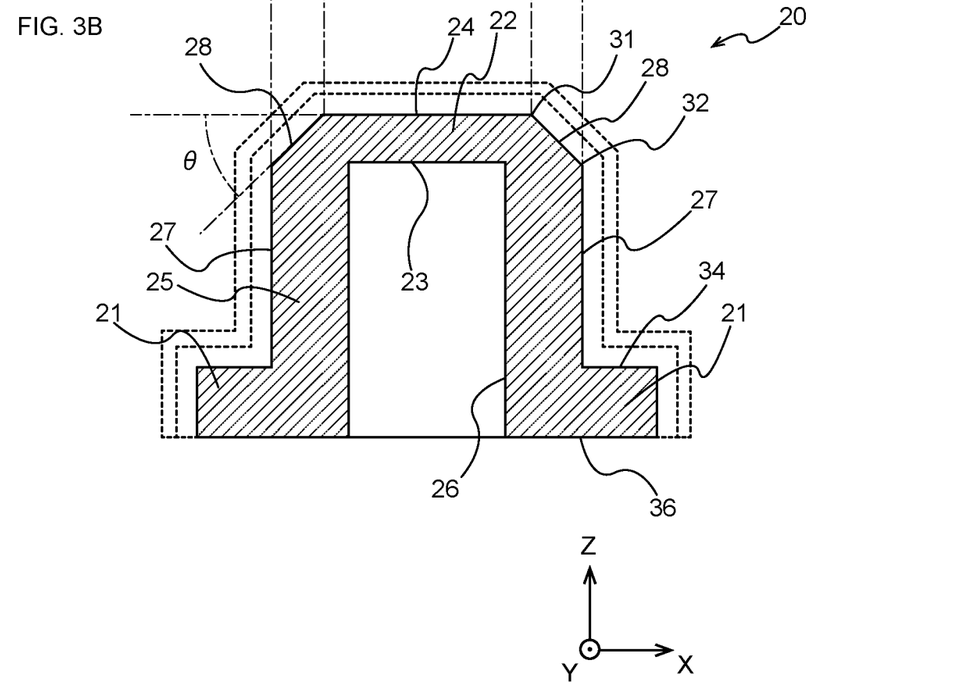

FIG. 3 is a conceptual diagram illustrating a shape of the stem 20 in the sensor main body 18 shown in FIG. 2. FIG. 3A is a top view of the stem 20 viewed from the positive side in the Z-axis, and FIG. 3B is a cross-sectional view of the stem 20 having a cross section parallel to the Z-axis. In FIG. 3B, the functional film for forming the detection circuit 50 and the insulating film 40 shown in FIG. 2 are illustrated by dotted lines. As shown in FIG. 3A and FIG. 3B, the outer surface of the stem 20 includes an outer bottom surface 24, a skirt portion 28, an outer side surface 27, a stepped surface 34, and an opening edge surface 36.

The outer bottom surface 24 is an end surface of the stem 20 on its upper side (positive side in the Z-axis direction) and has a circular flat shape. The outer side surface 27 extends in a direction intersecting the outer bottom surface 24. The outer side surface 27 shown in FIG. 3 extends in a direction (Z-axis direction) substantially perpendicular to the extending direction of the outer bottom surface 24 (X-axis and Y-axis directions) and has a cylindrical side surface shape.

As shown in FIG. 3A, the skirt portion 28 is formed so as to surround the outer bottom surface 24. As shown in FIG. 3B, the skirt portion 28 is a surface facing a direction different from that of the outer bottom surface 24 and the outer side surface 27 viewing from the Y-direction or the X-direction, which is a direction parallel to the outer bottom surface 24, and connects between the outer bottom surface 24 and the outer side surface 27.

As shown in FIG. 3A, a length L1 from a first boundary 31 between the outer bottom surface 24 and the skirt portion 28 to a second boundary 32 between the skirt portion 28 and the outer side surface 27 viewing from a direction perpendicular to the outer bottom surface 24 (Z-axis direction) is preferably 10 μm or more and 1 mm or less and is more preferably 40 μm or more and 500 μm or less. When the length L1 is a predetermined value or more, it is possible to reduce the stress concentration on the insulating film 40 formed on the skirt portion 28. When the length L1 of the skirt portion 28 is a predetermined value or less, the stem 20 is downsized.

As shown in FIG. 3B, the skirt portion 28 is composed of an inclined surface forming a predetermined angle θ with respect to the outer bottom surface 24 viewing in a cross section orthogonal to the outer bottom surface 24. The angle θ formed by the inclined surface forming the skirt portion 28 with respect to the outer bottom surface 24 is not limited, but is preferably, for example, 30 degrees to 60 degrees. When the angle θ is in such a range, the stress concentration on the insulating film 40 covering the outer surface of the stem 20 can be reduced even in the vicinities of both of the first boundary 31 between the outer bottom surface 24 and the skirt portion 28 and the second boundary 32 between the skirt portion 28 and the outer side surface 27.

As shown in FIG. 3, the skirt portion 28 may be composed of one continuous surface, but may have a plurality of surfaces having different orientations and angles. As shown in FIG. 3B, the inclined surface forming the skirt portion 28 shown in FIG. 3 forms a predetermined angle θ with respect to the outer bottom surface 24 viewing in a cross section orthogonal to the outer bottom surface 24. Such an inclined surface can easily and accurately be formed by, for example, machining and can reduce dimensional variation of the stem 20.

The stepped surface 34 of the stem 20 shown in FIG. 3 is an outer surface of the flange portion 21 and has a ring-shaped part extending in the X-axis and Y-axis directions and a cylindrical side surface part extending in the Z-axis direction. The opening edge surface 36 is a ring-shaped flat surface surrounding the opening of the cavity formed inside the stem 20 and constitutes an end surface of the stem 20 on the lower side (negative side in the Z-axis).

As shown in FIG. 3B, the inner surface of the stem 20 includes a pressure receiving inner surface 23 and an inner side surface 26. The pressure receiving inner surface 23 is an opposite surface of the outer bottom surface 24 of the bottom wall portion 22 and receives pressure from the fluid to be measured. As with the outer bottom surface 24, the pressure receiving inner surface 23 has a plane shape, but the outer bottom surface 24 is a surface facing the positive side in the Z-axis, and the pressure receiving inner surface 23 is a surface facing the negative side in the Z-axis.

When the pressure receiving inner surface 23 receives pressure from the fluid, the bottom wall portion 22 of the stem 20 is deformed and at least partly functions as a membrane (or diaphragm). The inner side surface 26 is the opposite surface of the outer side surface 27 of the side wall portion 25. The thickness of the bottom wall portion 22 of the stem 20 is determined so as to generate an appropriate deformation under the pressure of the fluid to be measured and can be, for example, smaller than the thickness of the side wall portion 25.

In the pressure sensor 10, as shown in FIG. 2 and FIG. 3B, the detection circuit 50 is provided on the outer bottom surface 24 opposite to the pressure receiving inner surface 23 via the insulating film 40 and detects the deformation of the bottom wall portion 22 and the pressure of the fluid. The detection circuit 50 shown in FIG. 1 and FIG. 2 is, for example, a circuit that detects the deformation of the bottom wall portion 22 and the pressure of the fluid by utilizing the piezoresistive effect, but is not limited to only this.

The detection circuit 50 is provided on the outer bottom surface 24 via the insulating film 40. As shown in FIG. 2, the detection circuit 50 is formed by subjecting a part of the functional film to laser processing or microfabrication by a semiconductor processing technique such as screen printing. As shown in FIG. 2, the functional film may be formed on the outer bottom surface 24, the skirt portion 28, the outer side surface 27, and the like, which are the outer surface of the stem 20, so as to indirectly cover them via the insulating film 40. Unlike this, the functional film may be formed only on the outer bottom surface 24 on which the detection circuit 50 is provided.

As shown in FIG. 2, the insulating film 40 is provided so as to directly contact with the outer bottom surface 24, the skirt portion 28, the outer side surface 27, and the like, which are the outer surface of the stem 20, and cover them. The insulating film 40 is formed between: the outer surface of the stem 20; and the detection circuit 50 and the functional film. The detection circuit 50 and the functional film are separated by the insulating film 40 and are not contacted with the stem 20.

Among the outer surface of the stem 20, the insulating film 40 is provided so as to cover the entire outer bottom surface 24 and at least a part of the skirt portion 28 connecting between the outer bottom surface 24 and the outer side surface 27. However, the insulating film 40 may cover the whole of the outer bottom surface 24 and the skirt portion 28 and, as shown in FIG. 2, may cover at least a part of the outer side surface 27 and the stepped surface 34 in addition to the outer bottom surface 24 and the skirt portion 28.

The insulating film 40 ensures the insulating property between the stem 20 and the detection circuit 50. In FIG. 2, the insulating film 40 is made of, for example, a thin film, and the thickness of the insulating film 40 is smaller than the wall thickness of the stem 20 or the like.

The pressure sensor 10 shown in FIG. 1 is manufactured by, for example, the following manufacturing process. In the manufacture of the pressure sensor 10, first of all, the stem 20 as shown in FIG. 3 is manufactured. The stem 20 is manufactured by, for example, subjecting a predetermined metal material to machining, such as pressing, cutting, and polishing. The skirt portion 28 shown in FIG. 3 can be formed by, for example, manufacturing an intermediate product in which the outer side surface 27 is connected perpendicularly to the outer bottom surface 24 and thereafter subjecting a corner of the intermediate product where the outer bottom surface 24 and the outer side surface 27 are connected to machining such as polishing.

Next, the insulating film 40 and the functional film are formed in multilayered manner on the outer surface of the stem 20, and the detection circuit 50 is formed on the multilayer film by subjecting the formed multilayer film to microfabrication with a semiconductor processing technique. The sensor main body 18 as shown in FIG. 2 is obtained through these steps. Further, the pressure sensor 10 as shown in FIG. 1 can be manufactured by fixing the sensor main body 18 to the connection member 12 or the like and wiring the substrate 70 and the detection circuit 50 by wire bonding or the like.

The functional film and the insulating film 40 having the detection circuit 50 are formed on the stem 20 by any method, such as sputtering method, vacuum vapor deposition method, CVD method, and sol-gel method. The insulating film 40 is made of any material, such as silicon oxide, silicon nitride, and alumina. The functional film is made of any material, such as semiconductors of silicon and metals with good conductivity.

As a patterning method for the functional film and the insulating film 40 having the detection circuit 50, for example, a photo patterning method, which is a semiconductor processing technique, can be used. Since the stem 20 includes the skirt portion 28 as shown in FIG. 2, it is possible to effectively prevent a problem that a resist or a thin film is ununiform at the vertical edge portion in the patterning or formation step of the functional film and the insulating film 40.

The size of the stem 20 included in the pressure sensor 10 is not limited. For example, the diameter of the outer side surface 27 shown in FIG. 3 is 3 mm to 20 mm. The thickness of the insulating film 40 formed on the stem 20 is not limited either, but is, for example, 500 nm to 100 μm. The thickness of the functional film formed on the stem 20 is not limited, but is, for example, 50 nm to 1 μm.

As described above, in the pressure sensor 10, as shown in FIG. 3, the outer bottom surface 24 and the outer side surface 27 are not directly connected, but the outer bottom surface 24 and the outer side surface 27 are connected via the skirt portion 28, and the insulating film 40 is provided thereon. Here, in the pressure sensor as shown in the embodiment, thermal stress is generated due to the difference in linear expansion coefficient between the stem material, such as metal and ceramic, and the insulating film, which is a high dielectric material. In the conventional pressure sensors, stress concentration occurs in the portion of the insulating film covering the vicinity of the vertical edge of the stem, which causes problems, such as cracking in the insulating film and peeling of the insulating film from the stem surface.

In the pressure sensor 10 described above, however, since the stem 20 includes the skirt portion 28 as shown in FIG. 2, the sudden change in the surface direction between the outer bottom surface 24 and the outer side surface 27 is reduced, and it is possible to reduce the stress concentration on the insulating film 40 formed along the outer surface of the stem 20. Thus, such a pressure sensor 10 can prevent the problems, such as cracking in the insulating film 40 and peeling of the insulating film 40 from the surface of the stem 20, and has high durability and reliability.

As shown in FIG. 3A, when the skirt portion 28 has a length L1 of 10 μm or more, the pressure sensor 10 can more effectively reduce the stress concentration on the insulating film 40 located in the vicinity of the skirt portion 28, the first boundary 31, and the second boundary 32. Thus, the pressure sensor 10 including such a skirt portion 28 can further improve the durability and reliability. When the skirt portion 28 has a length L1 of 1 mm or less, the pressure sensor 10 is downsized.

As shown in FIG. 3B, since the skirt portion 28 has an inclined surface forming an angle θ of 30 degrees to 60 degrees with respect to the outer bottom surface 24, it is possible to reduce the change in the surface direction in both of the first boundary 31 and the second boundary 32. Thus, the pressure sensor 10 can reduce the stress concentration on the insulating film 40 formed along the first boundary 31 and the second boundary 32.

Unlike stems having a conventional shape, the stem 20 of the pressure sensor 10 does not have a corner whose surface direction changes perpendicularly around the outer bottom surface 24 for disposing the detection circuit 50. Thus, the pressure sensor 10 using such a stem 20 can reduce defects generated in the manufacturing process, such as patterning defects and film formation defects, and thereby has good productivity.

Figure 4:
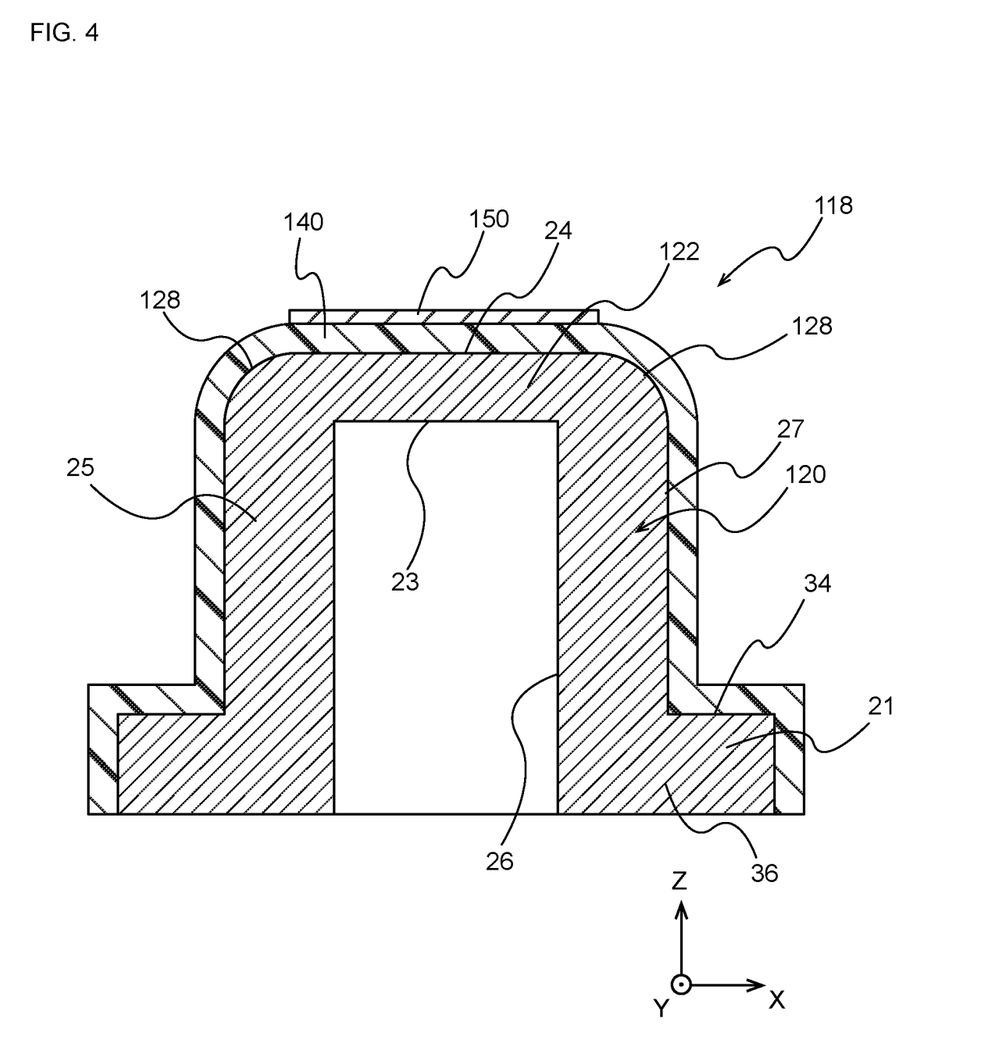
FIG. 4 is an enlarged cross-sectional view of a sensor main body included in a pressure sensor according to Second Embodiment of the present invention.

As described above, the pressure sensor according to the present invention is described with an embodiment, but needless to say, the present invention is not limited to only the above-described embodiment and may include many other embodiments and modifications. FIG. 4 is a schematic cross-sectional view illustrating a sensor main body 118 of a pressure sensor according to Second Embodiment of the present invention.

As shown in FIG. 4, the pressure sensor according to Second Embodiment is similar to the pressure sensor 10 according to First Embodiment except for the shape of a skirt portion 128 of a stem 120, the shape of an insulating film 140, and the shape of a functional film for forming a detection circuit 150. In the description of the pressure sensor according to Second Embodiment, only the differences from the pressure sensor 10 according to First Embodiment are described, and the common matters with the pressure sensor 10 are not described.

As shown in FIG. 4, the sensor main body 118 includes a stem 120, an insulating film 140, and a functional film for forming a detection circuit 150. The stem 120 is different from the stem 20 shown in FIG. 2 in terms of the shape of a skirt portion 128 disposed on the outer periphery of a bottom wall portion 122, but the other matters are similar to those of the stem 20.

Figure 5A:
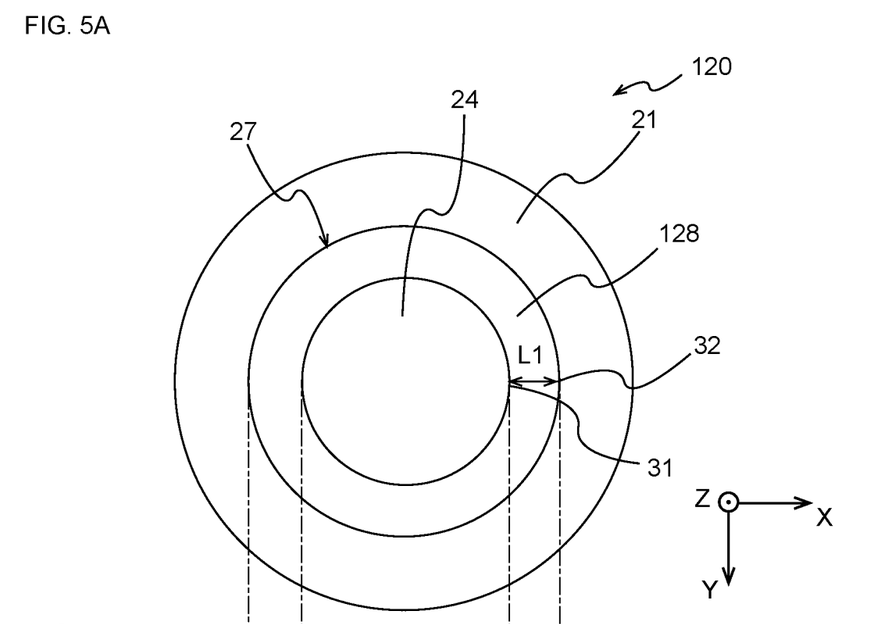
FIG. 5 is a conceptual diagram illustrating a shape of a stem included in the sensor main body shown in FIG. 4.
Figure 5B:
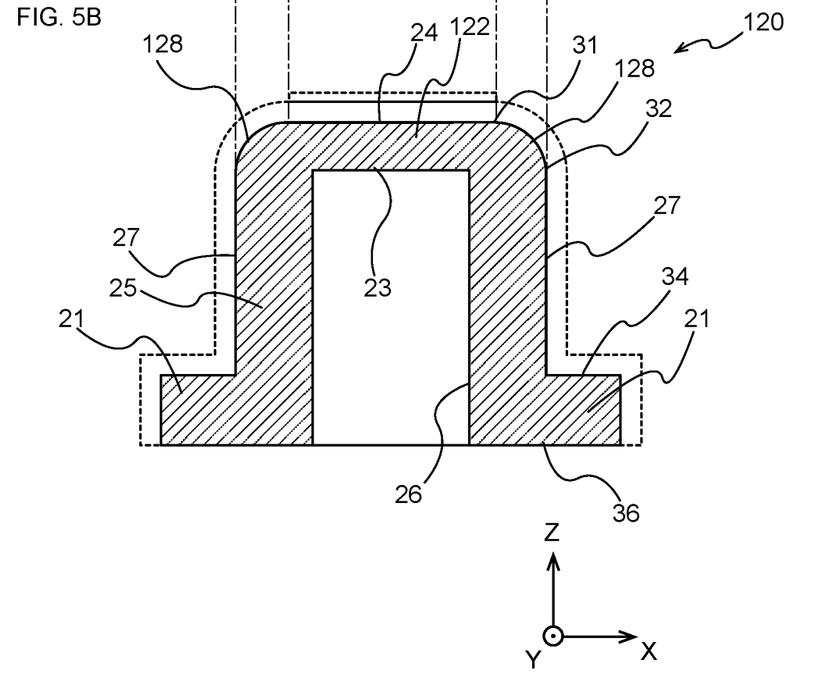

FIG. 5 is a conceptual diagram illustrating the shape of the stem 120 in the sensor main body 118 shown in FIG. 4. FIG. 5A is a top view of the stem 120 viewed from the positive side in the Z-axis, and FIG. 5B is a cross-sectional view of the stem 120 in a cross section parallel to the Z-axis. As shown in FIG. 5B, the skirt portion 128 has a curved surface shape whose angle formed with respect to the outer bottom surface 24 increases transitionally as a distance from the first boundary 31 increases in a cross section orthogonal to the outer bottom surface 24. For example, the skirt portion 128 may have the same radius of curvature as the length L1 of the skirt portion 128.

As shown in FIG. 5, the shape of the insulating film 140 follows the shape of the outer surface of the stem 120. As with the skirt portion 128, the part of the insulating film 140 located above the skirt portion 128 of the stem 120 thereby has a curved surface shape. The functional film for forming the detection circuit 150 is formed only on the outer bottom surface 24 with the insulating film 140 interposed therebetween. The insulating film 140 needs to cover the entire outer bottom surface 24, but does not need to cover the entire skirt portion 128. It is sufficient that the insulating film 140 covers at least a part of the skirt portion 128.

In the stem 120 shown in FIG. 4 and FIG. 5, the skirt portion 128 has a curved surface shape, and an angle θ formed by the skirt portion 128 and the outer bottom surface 24 increases as the distance from the first boundary 31 increases. Since the stem 120 including the skirt portion 128 with such a shape can reduce the change in the surface direction in the vicinity of the first boundary 31 and the second boundary 32, it is possible to more effectively prevent the stress concentration on the insulating film 140 covering the stem 120. The pressure sensor according to Second Embodiment exhibits the same effect as the pressure sensor 10 according to First Embodiment.

Figure 6A:
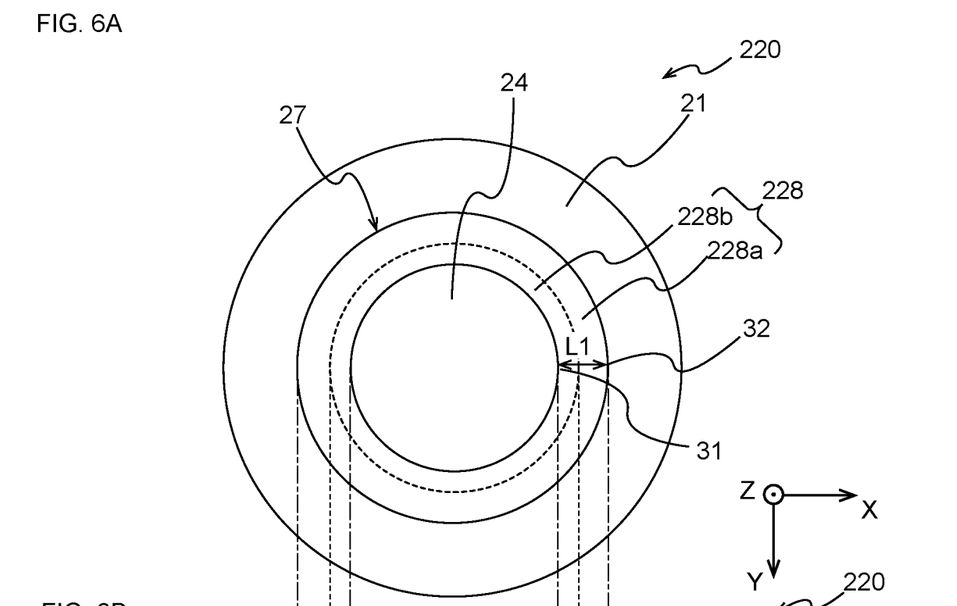
FIG. 6 is a conceptual diagram illustrating a shape of a stem included in a pressure sensor according to Third Embodiment of the present invention.
Figure 6B:
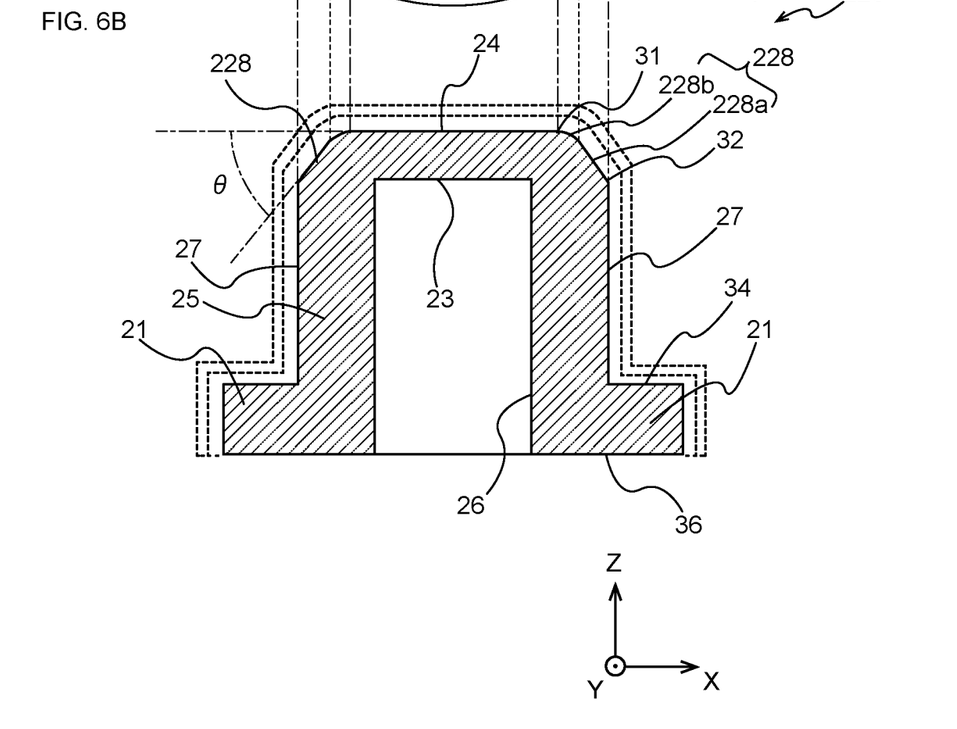

FIG. 6 is a conceptual diagram illustrating the shape of a stem 220 in a pressure sensor according to Third Embodiment of the present invention. FIG. 6A is a top view of the stem 220 viewed from the positive side in the Z-axis, and FIG. 6B is a cross-sectional view of the stem 120 in a cross section parallel to the Z-axis. As shown in FIG. 6, the pressure sensor according to Third Embodiment is similar to the pressure sensor 10 according to First Embodiment except that the shape of a skirt portion 228 of the stem 220 is different, and that the shapes of the insulating film and the functional film are changed to the shape along the skirt portion 228. In the description of the pressure sensor according to Third Embodiment, only the differences from the pressure sensor 10 according to First Embodiment are described, and the common matters with the pressure sensor 10 are not described.

As shown in FIG. 6B, the skirt portion 228 of the stem 220 has an inclined surface 228a forming an angle of 30 degrees to 60 degrees with respect to the outer bottom surface 24 and a connection surface 228b forming an angle smaller than that of the inclined surface 228a with respect to the outer bottom surface 24 viewing in a cross section orthogonal to the outer bottom surface 24. As shown in FIG. 6A, the outer bottom surface 24, the connection surface 228b, and the inclined surface 228a are formed concentrically, and the connection surface 228b and the inclined surface 228a are formed so as to surround the outer bottom surface 24.

As understood from the comparison between FIG. 3 and FIG. 6, the inclined surface may directly be connected to the outer bottom surface 24 like the inclined surface forming the skirt portion 28 shown in FIG. 3 or may be connected to the outer bottom surface 24 via the connection surface 228b like the inclined surface 228a shown in FIG. 6. As shown in FIG. 6, preferably, the surface included in the skirt portion 28 faces a direction between the direction of the outer bottom surface 24 connected in the first boundary 31 and the direction of the outer surface 27 connected in the second boundary 32 viewing in a cross section orthogonal to the outer bottom surface 24.

Since the skirt portion 28 includes the connection surface 228b and the inclined surface 228a, the pressure sensor using the stem 220 including the skirt portion 228 as shown in FIG. 6 effectively reduces the stress concentration on the insulating film covering the first boundary 31 and can effectively prevent generation of peeling and cracking in the insulating film on or near the outer bottom surface 24. The pressure sensor according to Third Embodiment exhibits the same effect as the pressure sensor 10 according to First Embodiment. The inclined surface 228a shown in FIG. 6 is not limited to a surface whose angle θ formed with respect to the outer bottom surface 24 is constant. Like the skirt portion 128 of the stem 120 shown in FIG. 5, the inclined surface of the stem 220 may be a curved surface whose angle formed with respect to the outer bottom surface 24 changes so as to be larger as the distance from the outer bottom surface 24 increases viewing in a cross section orthogonal to the outer bottom surface 24.

As described above, the pressure sensor according to the present invention is described with reference to a plurality of embodiments, but the present invention is not limited to the above-described embodiments and, needless to say, includes many other embodiments and modifications. The present invention includes many other embodiments. For example, the shape and fixed structure of the stem 20 shown in FIG. 1 is only an example, and the pressure sensor of the present invention can adopt any other shape and fixed structure in which the stem 20 is appropriately deformed in response to pressure.

Hereinafter, the present invention is described in more detail with reference to examples, but the present invention is not limited to these examples.

FIRST EXAMPLE

Figure 7:
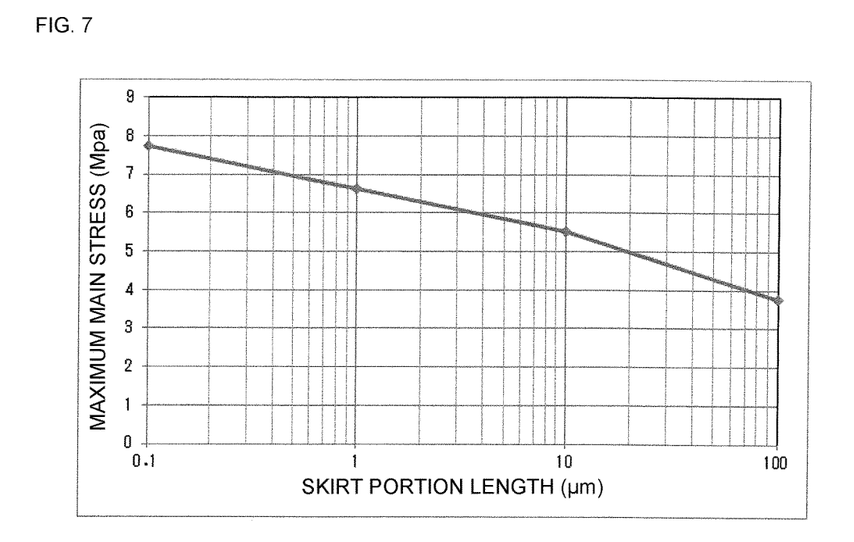
FIG. 7 is a graph illustrating a relation between a length of a skirt portion of a stem and a value of a maximum stress of an insulating film.

In a stem 120 provided with a skirt portion 128 having a curved surface corresponding to a length L1 of the skirt portion 128 as shown in FIG. 5, FIG. 7 is a graph illustrating a calculation result of a relation between a maximum main stress applied to the insulating film 140 formed on the skirt portion 128 and a length L1 of the skirt portion 128 of the stem 120 at the time of generation of a predetermined deformation on the pressure receiving inner surface 23 of the stem 120. Other main calculation conditions are as follows.

Material of Insulating Film: $SiO_2$
Thickness of Insulating Film: 1000 μm
Formation Method of Insulating Film: TEOS-CVD
Length L1 of Skirt Portion: 0.1 μm, 1 μm, 10 μm, 100 μm
Material of Stem: austenitic stainless steel
Temperature: 25° C.

It can be understood from FIG. 7 that the maximum main stress applied to the insulating film 140 is reduced by increasing the length L1 of the skirt portion 128. The value of maximum main stress is within a permissible range in which the insulating film 140 has no cracking in the range where the skirt portion 128 has a length of 1 μm or more, and a larger safety factor is secured in the range where the skirt portion 128 has a length of 10 μm or more.

SECOND EXAMPLE

Figure 8:
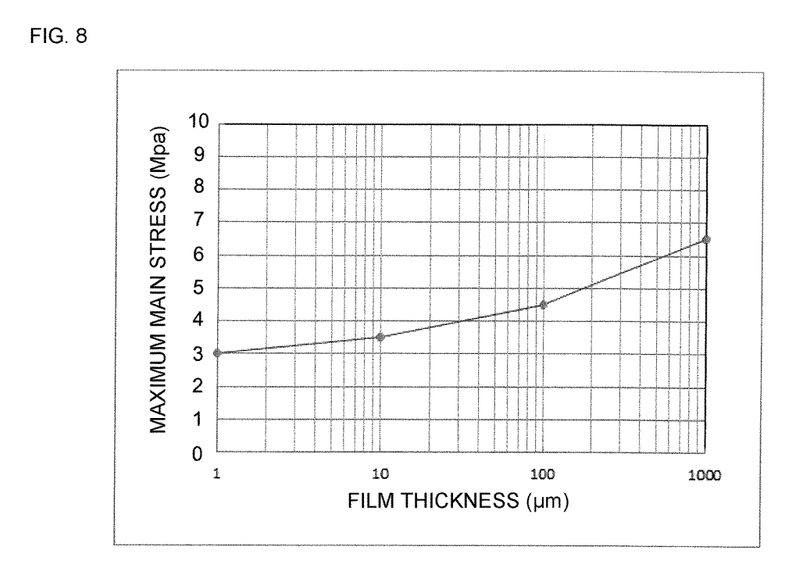
FIG. 8 is a graph illustrating a relation between a film thickness of an insulating film and a value of a maximum stress.

In FIG. 8, a maximum main stress applied to the insulating film 140 is calculated in the same manner as in First Example except for fixing the length L1 of the skirt portion 128 and changing the thickness of the insulating film 140. The main calculation conditions different from those in First Example are as follows.

Thickness of Insulating Film: 1 μm, 10 μm, 100 μm, 1000 μm
Length L1 of Skirt Portion: 1 μm It can be understood from FIG. 8 that the maximum main stress applied to the insulating film 140 is reduced by decreasing the thickness of the insulating film 140. As for the value of maximum main stress, a larger safety factor is secured in the range where the insulating film 140 has a thickness of 100 μm or less. As for the thickness of the insulating film 140, sufficient insulating properties are secured under any of the conditions in Second Example.

EXPLANATION OF REFERENCES

10 . . . pressure sensor
12 . . . connection member
12a . . . screw groove
12b . . . passage
14 . . . holding member
18, 118 . . . sensor main body
20, 120, 220 . . . stem
21 . . . flange portion
22, 122 . . . bottom wall portion (membrane)
23 . . . pressure receiving inner surface
24 . . . outer bottom surface
25 . . . side wall portion
26 . . . inner surface
27 . . . outer surface
28, 128, 228 . . . skirt portion 228a . . . inclined surface
228b . . . connection surface
31 . . . first boundary
32 . . . second boundary
34 . . . stepped surface
36 . . . opening edge surface
40, 140 . . . insulating film
50, 150 . . . detection circuit
70 . . . substrate portion
82 . . . connection wiring

The invention claimed is:

1. A pressure sensor comprising:
a stem including (i) a planar outer bottom surface, (ii) an outer side surface extending in a direction intersecting the outer bottom surface, (iii) a pressure receiving inner surface that is an opposite surface to the outer bottom surface and configured to receive pressure from a fluid to be measured and (iv) a skirt portion that (a) surrounds the outer bottom surface, (b) has a surface facing a direction different from facing directions of the outer bottom surface and the outer side surface when viewed from a direction parallel to the outer bottom surface and (c) connects the outer bottom surface and the outer side surface;
a detection circuit on the outer bottom surface; and
an insulating film interposed between the outer bottom surface and the detection circuit,
wherein
the insulating film covers the outer bottom surface, the skirt portion, and at least a part of the outer side surface.

2. The pressure sensor according to claim 1, wherein a length from a first boundary between the outer bottom surface and the skirt portion to a second boundary between the skirt portion and the outer side surface viewing from a direction perpendicular to the outer bottom surface is 10 µm or more and 1 mm or less.

3. The pressure sensor according to claim 1, wherein the skirt portion includes an inclined surface formed so as to surround the outer bottom surface and forming an angle of 30 degrees to 60 degrees with respect to the outer bottom surface viewing in a cross section orthogonal to the outer bottom surface.

4. The pressure sensor according to claim 3, wherein the inclined surface is directly connected to the outer bottom surface or is connected to the outer bottom surface via a connection surface forming an angle smaller than that of the inclined surface.

5. The pressure sensor according to claim 3, wherein the inclined surface forms a predetermined angle with respect to the outer bottom surface viewing in a cross section orthogonal to the outer bottom surface.

6. The pressure sensor according to claim 4, wherein the inclined surface forms a predetermined angle with respect to the outer bottom surface viewing in a cross section orthogonal to the outer bottom surface.

7. The pressure sensor according to claim 3, wherein the inclined surface changes so that an angle formed with respect to the outer bottom surface increases as a distance from the outer bottom surface increases viewing in a cross section orthogonal to the outer bottom surface.

8. The pressure sensor according to claim 4, wherein the inclined surface changes so that an angle formed with respect to the outer bottom surface increases as a distance from the outer bottom surface increases viewing in a cross section orthogonal to the outer bottom surface.

9. The pressure sensor according to claim 1, wherein the skirt portion has a curved surface shape whose angle formed with respect to the outer bottom surface increases transitionally as a distance from a first boundary between the outer bottom surface and the skirt portion increases viewing in a cross section orthogonal to the outer bottom surface.

10. The pressure sensor according to claim 1, wherein the outer side surface is substantially perpendicular to the outer bottom surface.

* * * * *